Dec. 29, 1959     H. O. SCHJOLIN     2,918,805
REFRIGERATING APPARATUS
Filed June 13, 1958     3 Sheets-Sheet 1
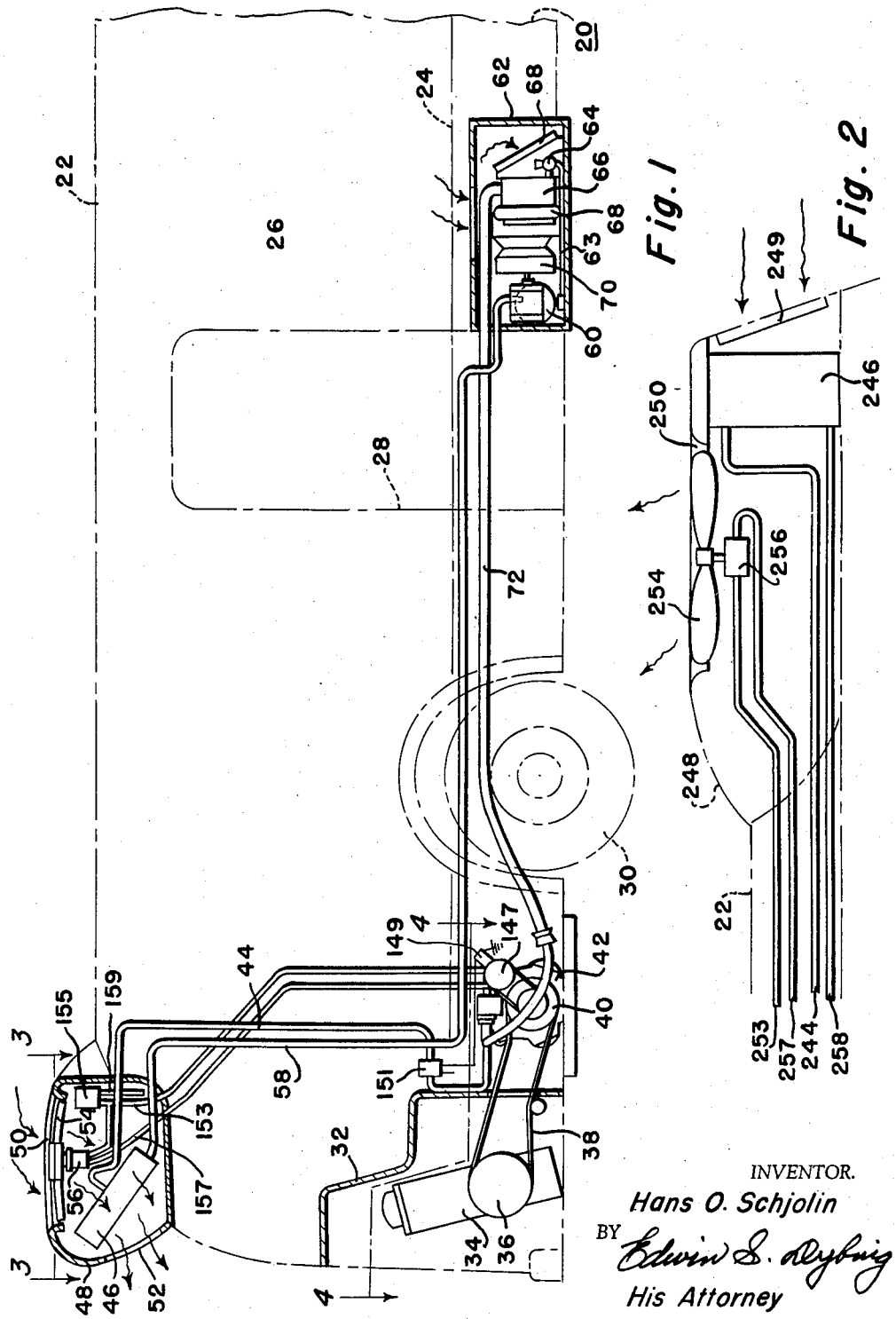
INVENTOR.
Hans O. Schjolin
BY *Edwin S. Wybrig*
His Attorney INVENTOR.
Hans O. Schjolin Dec. 29, 1959  H. O. SCHJOLIN  2,918,805
REFRIGERATING APPARATUS
Filed June 13, 1958  3 Sheets-Sheet 3

INVENTOR.
Hans O. Schjolin
BY Edwin S. Dybvig
His Attorney

United States Patent Office 2,918,805
Patented Dec. 29, 1959

2,918,805

REFRIGERATING APPARATUS

Hans O. Schjolin, Birmingham, Mich., assignor to General Motors Corporation, Detroit, Mich., a corporation of Delaware Application June 13, 1958, Serial No. 741,867

7 Claims. (Cl. 62—179)

This invention pertains to refrigerating apparatus and especially to the air conditioning of intra and inter-city buses.

It is an object of this invention to provide an air conditioning system for buses which will be lighter, less expensive and more efficient.

It is another object of this invention to provide an efficient, inexpensive air conditioning system wherein the compressor as well as a hydraulic pump for driving the condenser fan are mechanically driven through a clutch from the power take-off of the driving engine of the bus.

It is another object of this invention to provide a central combined heating and cooling system which is adequate for inter-city bus or transit coaches, which will not reduce the seating space or interfere with the standard and most effective seating arrangement or the internal appearance.

These and other objects are attained in the forms shown in the drawings in which the driving engine is conveniently mounted at the lower rear of the bus and connected by suitable transmission and shafting to the rear axle for driving the bus. The driving engine, through a power takeoff and cog belt drive and a pneumatically operated disc clutch, drives a compressor and a hydraulic fan drive pump. A pod is provided at the rear or front of the bus with a fan on top driven by a constant speed hydraulic fan motor from the hydraulic fan drive pump. The fan circulates air through the condenser which is connected to the compressor and to the evaporator located beneath the floor of the passenger compartment. A heater core and filter are provided in series with the evaporator. A blower draws air from within and outside the passenger compartment through the filter and evaporator and heater core to cool, dehumidify and reheat the air which is then discharged through lateral and upward ducts in the hollow side walls to discharge apertures beneath the windows to prevent condensation on the windows and provide a desirable circulation of properly conditioned air throughout the passenger compartment. The hydraulic fan drive system relieves the electrical system of a heavy load and is arranged so that there is no interference with the standard seating arrangement for the bus.

Further objects and advantages of the present invention will be apparent from the following description, reference being had to the accompanying drawings wherein a preferred embodiment of the present invention is clearly shown.

In the drawings:

Figure 1 is a diagrammatic view, partly in section, of an intra-city or transit bus embodying one form of my invention;

Figure 2 is a modified form showing the location of the condenser and condenser fan on the roof at the front of the bus;

Figure 3:
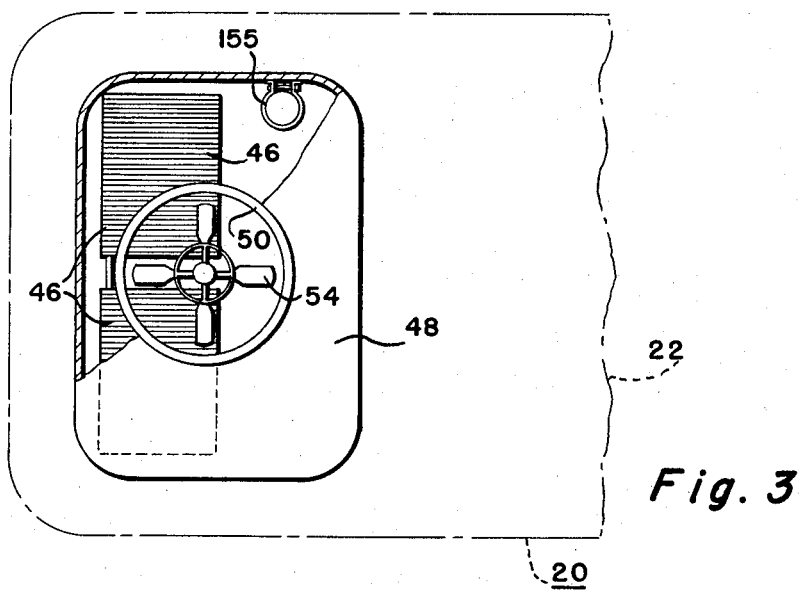
Figure 3 is a top view, partly in section, showing the condenser pod on the roof at the rear of the bus in the arrangement of Figure 1.
Figure 4:
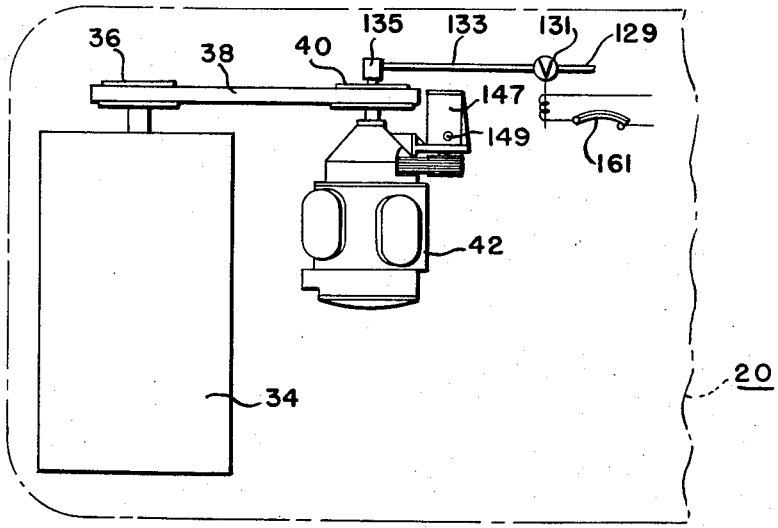
Figure 4 is a fragmentary sectional view taken substantially along line 4—4 of Figure 1 showing the driving engine, the compressor and the hydraulic fan drive pump.

Referring now to the drawing, and more particularly to Figure 1, there is shown an intra-city or transit bus 20 provided with a roof 22, a floor 24, a passenger compartment 26, a rear door 28 and rear wheels 30. At the back of the bus is provided an irregular fire wall 32 behind which is the driving engine 34 connected by conventional transmission and shafting to the rear axle driving the rear wheels 30 of the bus. The driving engine 34 has a power takeoff 36 provided with a cog wheel pulley for driving the cogged belt 38 connecting to a cog wheel driven pulley 40 on a four-cylinder compressor 42 mounted between the driving engine 34 and the rear axle. The compressor 42 is part of a 10-ton refrigerating system which employs monochlorodifluoromethane, known as "Freon 22" as a refrigerant which permits the use of smaller components in providing a refrigerating system of adequate size. Preferably, the compressor 42 is a four-cylinder compressor in which two of the cylinders can be unloaded in response to lowered suction pressure automatically as the cooling requirements fall.

The compressor is connected by a discharge pipe 44 to a condenser 46 located in the condenser pod 48 on the roof 22 at the rear of the bus. This pod includes a central top opening 50 and a rear discharge opening 52. A single large fan 54 rotates on a vertical axis and is driven by a constant speed hydraulic motor 56 to circulate air through the condenser 46. The refrigerant condenses in the condenser 46 and is drained through the liquid conduit 58 into a receiver 60 located in the air conditioning compartment 62 beneath the floor 24 of the passenger compartment 26 in front of the rear door 28. The liquid refrigerant in the receiver 60 is conducted through a pipe 63 and an expansion valve 64 to the evaporator 66. In front of the evaporator 66 is an air filter 68 and behind the evaporator 66 is a heater coil 68 and a blower 70 which draws part of the air from the interior of the passenger compartment 26 and part from the outside through the filter 68, evaporator 66 and the heater coil 68 in series and discharges the conditioned air into laterally extending ducts in the side wall which discharge through vertical ducts in the side wall leading to discharge openings directly beneath each of the windows. To cool the interior of the passenger compartment 26, the evaporator reduces the temperature of the air below the desired temperature in the compartment 26 to dehumidify the air. The air is then reheated to a desirable temperature by the heater coil. The air evaporates the refrigerant in the evaporator 66, which returns through the suction conduit 72 to the compressor 42.

Figure 5:
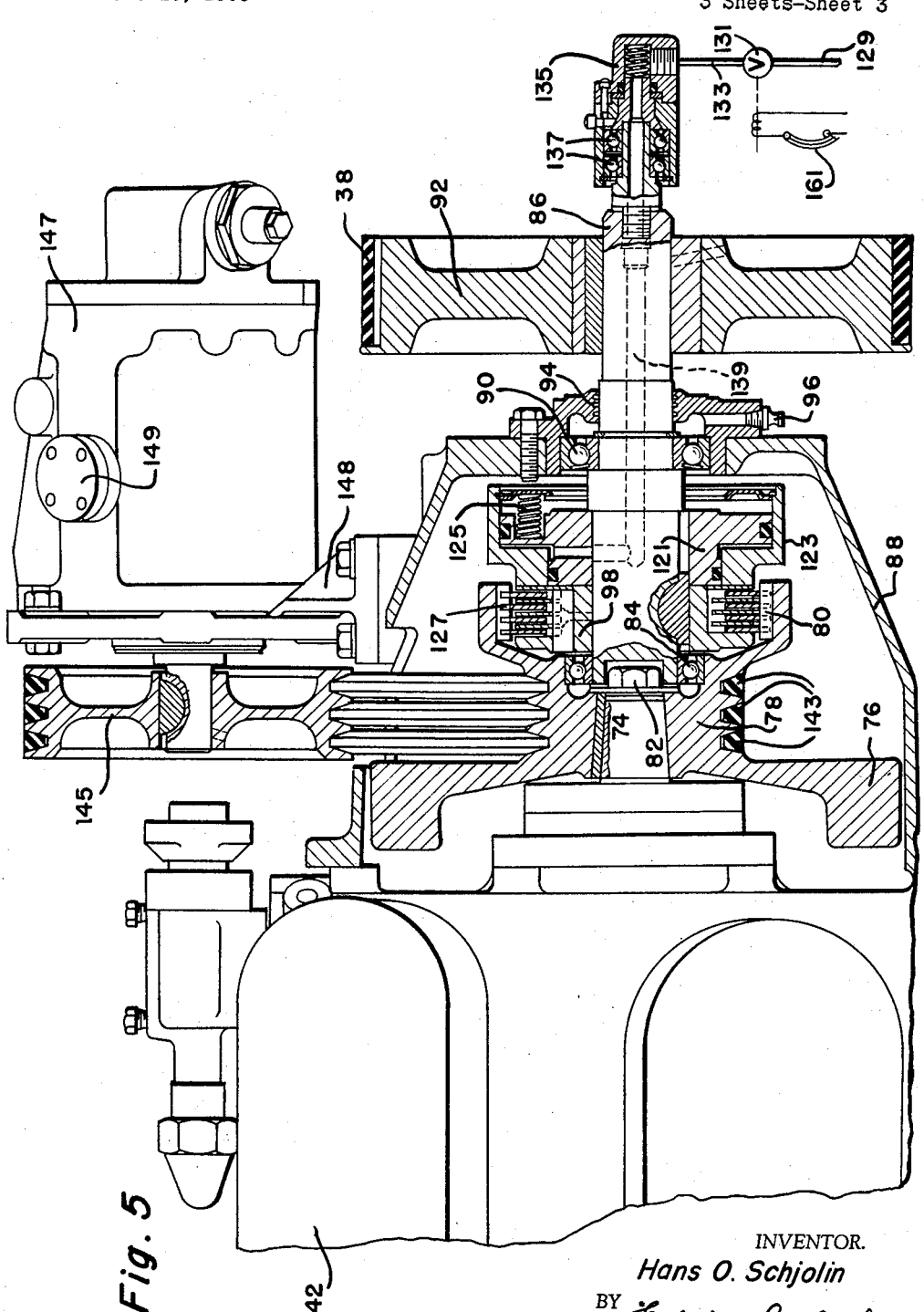
Figure 5 is an enlarged detail view of the compressor, the hydraulic fan drive pump, the clutch and driving connections.

As better shown in Figure 5, the compressor 42 is provided with a tapered shaft end fitting 74. Mounted on this fitting 74 is a combined flywheel 76, a three-grooved pulley 78 and one element 80 of a multiple disc clutch. All these three are a part of a single casting fastened to the fitting 74 by a nut 82. The pulley portion 78 carries a ball bearing 84 which rotatably supports one end of a short connecting shaft 86. Fastened to the adjacent face of the compressor 42 is a bell housing 88 carrying at its outer end a ball bearing 90 which provides a second bearing support for the short shaft 86. The outer end of the short shaft 86 carries a cog wheel type pulley 92 adapted to be driven by the cog belt 38. The outer end of the bell housing 88 also carries a suitable labyrinth seal 94 and the space between the seal 94 and the bearing 90 is provided with lubrication through the fitting 96.

Keyed to the inner end of the shaft 86 is the second element 98 of the multipled disc clutch. The multiple disc clutch operating mechanism includes a piston 121 which is fixed upon and keyed to the shaft 86 and located within the movable cylinder 123. The piston 121 and the cylinder 123 are step-shaped with an expansible chamber being located between the packing rings on the inner and outer diameters. In this specific arrangement, the cylinder 123 is slidably mounted on the piston 121. Return springs 125 tend to pull the cylinder 123 away from the multiple discs 127 of the two clutch elements so that the clutch elements 80 and 98 can be disengaged. When it is desired to engage the clutch elements, air pressure from the air pressure system of the bus is supplied through the pipe 129, the valve 131 and the pipe 133 to a fitting 135 rotatably mounted upon the end of the shaft 86 upon double ball bearings 137. This rotatable fitting 135 is sealed to the end of the shaft 86 which is provided with a central air supply passage 139 and radial passages in the shaft 86 and the piston 121 extending into the space between the piston 121 and the cylinder 123 for moving the cylinder 123 so as to force the discs 127 of the clutch elements into clutching engagement.

This causes a drive from the belt 32 through the pulley 92 and the shaft 86 from the clutch element 98 to the clutch element 80 and the fitting 74 to the compressor 42. At the same time, three V-belts 143 on the pulley 78 drive the pulley 145 upon the drive shaft of a hydraulic pump 147. This hydraulic pump 147 by the bracket 148 is mounted upon a pad of the bell housing 88. The bell housing 88 has an opening through which the belts 143 extend. The hydraulic pump 147 is of the variable stroke piston type provided with an internal control through which it delivers a substantially constant supply of hydraulic fluid regardless of its speed of operation. The speed of the driving engine 34 varies between 700 r.p.m. at fast idling to maximum operating speeds of 1650 to 1850 r.p.m. The internal control of the hydraulic pump provides a substantially constant supply of hydraulic fluid regardless of the variations in the speed of the driving engine 34.

The hydraulic pump 147 is also provided with a solenoid controlled internal bypass valve 149 by which the supply of hydraulic fluid to the fan motor 56 can be stopped whenever the condenser 46 is sufficiently cool. This bypass valve 149 may be controlled by a head pressure switch 151 responsive to the pressure in the discharge pipe 44 of the compressor 42. The discharge from the pump 147 discharges into a pipe 153 connecting with a hydraulic reservoir 155 and also with the constant speed hydraulic fan motor 56. The hydraulic fan motor 56 has a discharge conduit 157 and the hydraulic reservoir has an overflow conduit 159 which connect to the inlet of the hydraulic pump 147. The single large fan 54 driven by the hydraulic motor 56 efficiently circulates the air through the pod 48 and the condenser 46 to cool the compressed refrigerant. Whenever the refrigerating system is stopped by the closing of the solenoid valve 131 caused by the opening of the thermostat or manual switch 161 to disengage the clutch elements 98 and 80, the hydraulic pump 147 is stopped along with the compressor. This conserves the use of power.

In an alternative arrangement, shown in Figure 2, a condenser pod 248 is mounted on the roof 22 at the front of the bus. This pod 248 has a front opening 249 leading directly to the condenser 246 so that the condenser 246 gets the benefit of the ram effect caused by the movement of the bus through the air. The air, after flowing through the condenser 246, flows upwardly within the pod 248, out through the top opening 250 within which is a large propeller-type fan 254. The fan 254 rotates on a vertical axis and is driven by a constant speed hydraulic motor 256 which is similar to the fan motor 56 and is connected by supply and return conduits 253 and 257 connecting with the discharge and intake connections of the hydraulic pump 147. The condenser 246 is connected by supply and liquid conduits 244 and 258 corresponding to the supply and liquid conduits 44 and 58 in Figure 1. The system with the front mounted condenser pod operates in the same manner as the rear mounted pod. However, this system is more efficient because of the ram effect of the air provides sufficient circulation of air through the condenser 26 at normal operating speeds that the high pressure switch 151 will open the bypass valve 149 in the hydraulic pump 147 to stop the fan 254. Forced circulation of air for the condenser 246 is normally only required when the bus is operating at less than twelve miles an hour or when outdoor temperatures are unusually high. By this arrangement, I have provided an efficient, effective air conditioning system for both intra and inter-city buses. The capacity of the refrigerating system can be controlled by unloading one or two cylinders of the four-cylinder compressor 42 automatically when the suction pressure is low or by declutching the compressor 42 and the pump 147 from the driving engine 34 by the air operated clutch mechanism.

While the embodiment of the present invention as herein disclosed constitutes a preferred from, it is to be understood that other forms might be adopted.

What is claimed is as follows:

1. In a passenger vehicle having a passenger compartment provided with a floor and a roof, a driving means for said vehicle located adjacent said floor, a condenser compartment adjacent the roof of said vehicle having a top opening and a second opening, an air conditioning means for said passenger compartment including a compressor located adjacent said driving means and a condenser located in said condenser compartment and an evaporating means located adjacent said passenger compartment, a mechanical drive connection including a clutch between said driving means and said compressor, condenser cooling fan means located in said condenser compartment for circulating cooling air through said condenser compartment and said condenser, means for circulating air into heat exchange relation with said evaporator and discharging the cooled air into said passenger compartment, a hydraulic motor adjacent to and drivingly connected to said condenser fan means, and a hydraulic pump adjacent to and driven coincidentally with said compressor for supplying fluid under pressure to said hydraulic motor and stopped by the disengagement of said clutch.

2. In a passenger vehicle having a passenger compartment provided with a floor and a roof, a driving means for said vehicle located adjacent said floor, a condenser compartment adjacent the roof of said vehicle having a top opening and a second opening, an air conditioning means for said passenger compartment including a compressor located adjacent said driving means and a condenser located in said condenser compartment and an evaporating means located adjacent said passenger compartment, a mechanical drive connection including a clutch between said driving means and said compressor, a propeller type condenser cooling fan means located in said condenser compartment adjacent said top opening for circulating air through said condenser, means for circulating air into heat exchange relation with said evaporator and discharging the cooled air into said passenger compartment, a hydraulic motor adjacent to and drivingly connected to said condenser fan means, and a hydraulic pump adjacent to and driven coincidentally with said compressor for supplying fluid under pressure to said hydraulic motor and stopped by the disengagement of said clutch.

3. In a passenger vehicle having a passenger compartment provided with a floor and a roof, a driving means for said vehicle located adjacent said floor, a condenser compartment adjacent the roof of said vehicle having a top opening and a second opening, an air conditioning means for said passenger compartment including a compressor located adjacent said driving means and a condenser located in said condenser compartment and an evaporating means located adjacent said passenger compartment, a mechanical drive connection including a clutch between said driving means and said compressor, said condenser compartment being in the form of a pod carried on the roof of said vehicle provided with said top and second openings, a propeller type fan means located in said top opening for circulating air through said condenser, means for circulating air into heat exchange relation with said evaporator and discharging the cooled air into said passenger compartment, a hydraulic motor adjacent to and drivingly connected to said condenser fan means, and a hydraulic pump adjacent to and driven coincidentally with said compressor for supplying fluid under pressure to said hydraulic motor and stopped by the disengagement of said clutch.

4. In a passenger vehicle having a passenger compartment provided with a floor and a roof, a driving means for said vehicle located adjacent said floor, a condenser compartment adjacent the roof of said vehicle having a top opening and a second opening, an air conditioning means for said passenger compartment including a compressor located adjacent said driving means and a condenser located in said condenser compartment and an evaporating means located adjacent said passenger compartment, a mechanical drive connection including a clutch between said driving means and said compressor, condenser cooling fan means located in said condenser compartment for circulating cooling air through said condenser compartment and said condenser, means for circulating air into heat exchange relation with said evaporator and discharging the cooled air into said passenger compartment, a hydraulic system including a hydraulic motor adjacent to and drivingly connected to said condenser fan means and a hydraulic pump drivingly connected to said drive connection between said clutch and said compressor and conduit means operatively connecting said pump and said motor for supplying liquid under pressure to said motor, and means responsive to a reduced compressor discharge pressure for reducing the circulation of the hydraulic liquid through said hydraulic motor.

5. In a passenger vehicle having a passenger compartment provided with a floor and a roof, a driving means for said vehicle located adjacent said floor, a condenser compartment adjacent the roof of said vehicle having a top opening and a second opening, an air conditioning means for said passenger compartment including a compressor located adjacent said driving means and a condenser located in said condenser compartment and an evaporating means located adjacent said passenger compartment, said compressor having a drive shaft provided with a drive pulley and a first clutch element, a rotatably mounted connecting shaft coaxially aligned with said drive shaft provided with a second clutch element cooperating with said first clutch element to provide a clutch connection with said drive pulley and drive shaft, a mechanical drive connection operably connecting said driving means and said connecting shaft, a hydraulic motor adjacent to and drivingly connected to said condenser fan means, a hydraulic pump provided with a driven pulley and a belt connecting with said drive pulley, and conduit means operatively connecting said pump and motor for supplying liquid under pressure to said motor.

6. In a passenger vehicle having a passenger compartment provided with a floor and a roof, a driving means for said vehicle located adjacent the floor, an air conditioning means for said passenger compartment including a compressor and an evaporating means located adjacent said passenger compartment and an air cooled condenser located adjacent said roof, condenser cooling fan means located adjacent said condenser for circulating outside air through said condenser, a hydraulic motor adjacent to and drivingly connected to said fan means, said compressor having a driven shaft with a first pulley and a clutch element and a first bearing thereon in coaxial relationship, a bell housing fastened to said compressor enclosing said pulley and clutch element and provided with a coaxially located second bearing at the end remote from said compressor, a shaft rotatably mounted in said first and second bearings and protruding from said housing, a second clutch element mounted on said shaft, a hydraulic pump hydraulically connected to said hydraulic motor mechanically connected by a second pulley and belt to said first pulley, and mechanical drive means connecting said driving means and said shaft.

7. In a passenger vehicle having a passenger compartment provided with a floor and a roof, a driving means for said vehicle located adjacent the floor, an air conditioning means for said passenger compartment including a compressor and an evaporating means located adjacent said passenger compartment and an air cooled condenser located adjacent said roof, condenser cooling fan means located adjacent said condenser for circulating outside air through said condenser, a hydraulic motor adjacent to and drivingly connected to said fan means, said compressor having a driven shaft with a first pulley and a clutch element and a first bearing thereon in coaxial relationship, a bell housing fastened to said compressor enclosing said pulley and clutch element and provided with a coaxially located second bearing at the end remote from said compressor, a shaft rotatably mounted in said first and second bearings and protruding from said housing, a second clutch element mounted on said shaft, a hydraulic pump hydraulically connected to said hydraulic motor mechanically connected by a second pulley and belt to said first pulley, and mechanical drive means connecting said driving means and said shaft, said shaft being provided with a fluid actuated clutch operating means within said housing cooperating with said clutch elements, said shaft being also provided with a fluid connection with said clutch operating means incorporating a connecting portion rotatably mounted upon a portion of the shaft, said vehicle having a controllable fluid connection connecting with said rotatably mounted connecting portion for controlling said clutch operating means.

References Cited in the file of this patent
UNITED STATES PATENTS

| | | |
|---|---|---|
| 2,443,472 | Mayo | June 15, 1948 |
| 2,750,760 | Kaufman | June 19, 1956 |
| 2,841,963 | Schjolin | July 8, 1958 |